United States Patent
Shay et al.

(10) Patent No.: US 7,796,326 B1
(45) Date of Patent: Sep. 14, 2010

(54) APPARENT INCOHERENCE METHOD

(75) Inventors: Thomas M. Shay, Albuquerque, NM (US); Craig A. Robin, Albuquerque, NM (US); Athanasios Gavrielides, Albuquerque, NM (US); Justin Spring, Fairborn, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 906 days.

(21) Appl. No.: 11/625,372

(22) Filed: Jan. 22, 2007

(51) Int. Cl.
*H01S 3/00* (2006.01)
(52) U.S. Cl. .................................................... 359/349
(58) Field of Classification Search ................. 359/349, 359/279
See application file for complete search history.

(56) References Cited

U.S. PATENT DOCUMENTS

| | | | |
|---|---|---|---|
| 7,058,098 B1 * | 6/2006 | Shay | 372/29.016 |
| 7,187,492 B1 * | 3/2007 | Shay | 359/349 |
| 7,233,433 B1 * | 6/2007 | Shay | 359/349 |

OTHER PUBLICATIONS

J. A. Anguita, et al., "Multi-Beam Space-Time Coded Systems for Optical Atmospheric Channels," Proc. of SPIE, vol. 6304 63041B, 2006.
R. M. Khandekar, et al., "Mitigation of Dynamic Wavefront Distortions using a Modified Simplex Optimization Approach," Proc. of SPIE vol. 6304, 63041J, 2006.
Iwai and Asukura, published in the Proceedings of IEEE, vol. 84, No. 5, May 1996.
Kim et al., "Scintillation reduction using multiple transmitters," SPIE vol. 2990, pp. 102-113, 1997.

* cited by examiner

*Primary Examiner*—Tarifur Chowdhury
*Assistant Examiner*—Jonathan M Hansen
(74) *Attorney, Agent, or Firm*—Kenneth E. Callahan

(57) ABSTRACT

A method and system whereby a narrow linewidth coherent laser source when transmitted as a plurality of output signals and subsequently detected at a distance appears to produce the uniform illumination characteristics of an incoherent source thereby suppressing laser speckle and environmentally induced scintillation effects. A master oscillator source is split into N signals, each of which is independently phase modulated by frequencies designed to minimize a derived apparent incoherence factor. The signals are then either directed to an object to be illuminated so that they overlap at the object or first recombined and directed to the object.

8 Claims, 3 Drawing Sheets

APPARENT INCOHERENCE METHOD

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention generally relates to an improved method and apparatus for coherent optical information processing, and in particular to the reduction and elimination of the measured intensity variations in spatial patterns due to laser speckle and/or propagating-media-induced spatial or temporal phase shifts. The invention has application for coherent optical imaging, free space optical communications (FSO), and anywhere an incoherent, narrow bandwidth, optical source is needed Speckle and scintillation have been limiting factors in information transfer with coherent light sources since the advent of the laser. Speckle is the mottled light intensity pattern that results when a laser is reflecting off a non-specular surface. In an imaging system the mottled intensity pattern overlays the actual image and degrades quality.

Scintillation causes fluctuations in laser beam power resulting from transverse phase variations in the wavefront. This effect is most commonly encountered in free space laser propagation. The atmosphere can be seen as being made up of many small pockets of turbulent air, each having slightly different refractive index properties. As a laser beam propagates, these pockets act as weak lenses which deflect the light slightly and cause random transverse path length differences. This gives rise to coherent combinations which are seen by a detector system as power fluctuations. A variation in power at the detector can result in a loss of information.

These phenomena are a result of the coherent nature of laser light, and are inherent to any system employing a coherent source. For free-space laser communications scintillation effects are the major driver for determining the transmitter power in a single transmitter communications system operating in clear air. The excess power that must be transmitted to keep the burst error rate above $10^{-6}$ is between 300 and 1 million times the minimum power that would be required to maintain this error rate in the absence of scintillation (Kim et al., "Scintillation Reduction Using Multiple Transmitters," SPIE vol. 2990, pp. 102-113, 1997). Many patents and scientific papers have addressed the problem of speckle and scintillation by affecting the spatial or temporal coherence of the source. U.S. Pat. Nos. 4,961,195 and 5,048,029, by Shupsky et al., require a broad bandwidth laser source. The plurality of frequencies contained in the source is exploited to give rise to coherent combinations, which change so fast over the spatial extent on the beam, that the detection system time averages the signal making it seem incoherent. Any power fluctuations due to scintillation are mitigated. The drawback to this technology is the fact that a broad bandwidth source is required, an unattractive feature for FSO.

A similar method and arrangement is prescribed in U.S. Pat. No. 6,738,105 B1, by Hannah et al. In this arrangement speckle reduction is achieved by propagating a coherent light source through a mechanically rotated random phase plate. The scope of the invention described is limited to detector integration times comparable to that of the human eye, nominally 60 Hz. A random phase plate creates a large number of path length differences in the transverse extent of the beam such that the intensity fluctuations occur on a very small scale. Rotation of the phase plate shifts the position of these fluctuations so as to be averaged by the detection system. The arrangement does not address speckle issues and does not apply to FSO and imaging systems which require large bandwidth information capture.

Spatial phase modulation is also demonstrated in U.S. Pat. No. 6,898,216 B1, by Kleinschmidt and U.S. Pat. No. 6,952,435, B2, by Lai et al. The methods and apparatuses described in these arrangements require a mechanically manipulated element which reduces spatial coherence. The mechanical nature of the solutions rendered these methods unsuitable for many FSO implementations.

U.S. Pat. No. 6,863,216 B2, by Tsikos et al., also addresses this issue with spatial phase modulation, but is very general in how that modulation is realized. The method described reduces speckle for a planar laser illumination and imaging based camera system, used in illuminating moving and stationary objects. However, Tsikos fails to discuss temporal phase modulation by use of myriad modulating techniques, and applies the technology to a specific laser system that is not applicable to FSO.

Currently the most popular method of speckle reduction for FSO is aperture averaging. The general concept is to increase the size of the receiving aperture so that no power is lost due to intensity fluctuations caused by scintillation effects. The most common methods for dealing with atmospheric turbulence of which aperture averaging is one is discussed by Anguita (J. A. Anguita, et al., "Multi-Beam Space-Time Coded Systems for Optical Atmospheric Channels," Proc. of SPIE, Vol. 6304 63041 B, 2006). The drawbacks are as follows. Scaling aperture size is costly and often times inconvenient. Furthermore, a larger aperture requires a larger detector. As of late aperture averaging has been implemented with multiple signal transmission elements. This arrangement exploits the effect of scintillation causing a higher density speckle pattern at the receiver, in essence a reduction in spatial coherence.

The increase in computing power has allowed digital image processing techniques to be developed for speckle reduction. This art generally relies on a wavefront detection scheme and then an optimization metric to manipulate the source and compensate for the atmospheric turbulence. In the scientific paper by Khandekar et al. a feedback system is described when a wavefront is measured, analyzed and compensated for with a liquid crystal spatial light modulator (SLM) (R. M. Khandekar, et al., "Mitigation of Dynamic Wavefront Distortions using a Modified Simplex Optimization Approach," Proc. of SPIE Vol. 6304, 63041J, 2006). The process solves the problem of scintillation by applying the inverse of the scintillation obtained in signal propagation at the transmitted source. The drawback to this specific technology is related to the speed at which the liquid crystal SLM can be adjusted. Also the method is slowed by the computer algorithm used to dissect each the aberrant wavefronts.

The prior art has also reduced scintillation and speckle effects by changing the temporal coherence of the source. The general idea is to make the coherence time of the laser less than the integration time of the detector. Implicit in this solution is the generation of a broadband source. The drawbacks of having a wide bandwidth source in FSO are obvious and current research is almost entirely directed toward spatial averaging and digital information processing. This technique and those described above, as well as many others are discussed in the scientific paper by Iwai and Asukura, published in the Proceedings of IEEE, Vol. 84, No. 5, May 1996.

The prior art generally fails to solve the problem of speckle and scintillation for the diversity of applications to which these issues apply. Thus there is a need for a method that is applicable to any coherent optical information process where speckle and scintillation are limiting factors, while avoiding the shortcomings of the prior art.

SUMMARY OF THE INVENTION

The present invention discloses a method and system whereby a narrow linewidth coherent laser source when transmitted as a plurality of output signals and subsequently detected at a distance appears to produce the uniform illumination characteristics of an incoherent source, thereby suppressing laser speckle and environmentally induced scintillation effects. The output of a master oscillator source, either cw or pulsed, is split into N separate signals. The N signals are then independently phase modulated by phase modulation frequencies calculated to minimize an apparent incoherence factor to the desired degree. These signals are then either directed to a target so that they overlap at the target or first recombined and then directed at the target. The result is to suppress the measured intensity variations in spatial patterns due to laser speckle and scintillation effects.

DESCRIPTION OF THE PREFERRED EMBODIMENT

Figure 1:
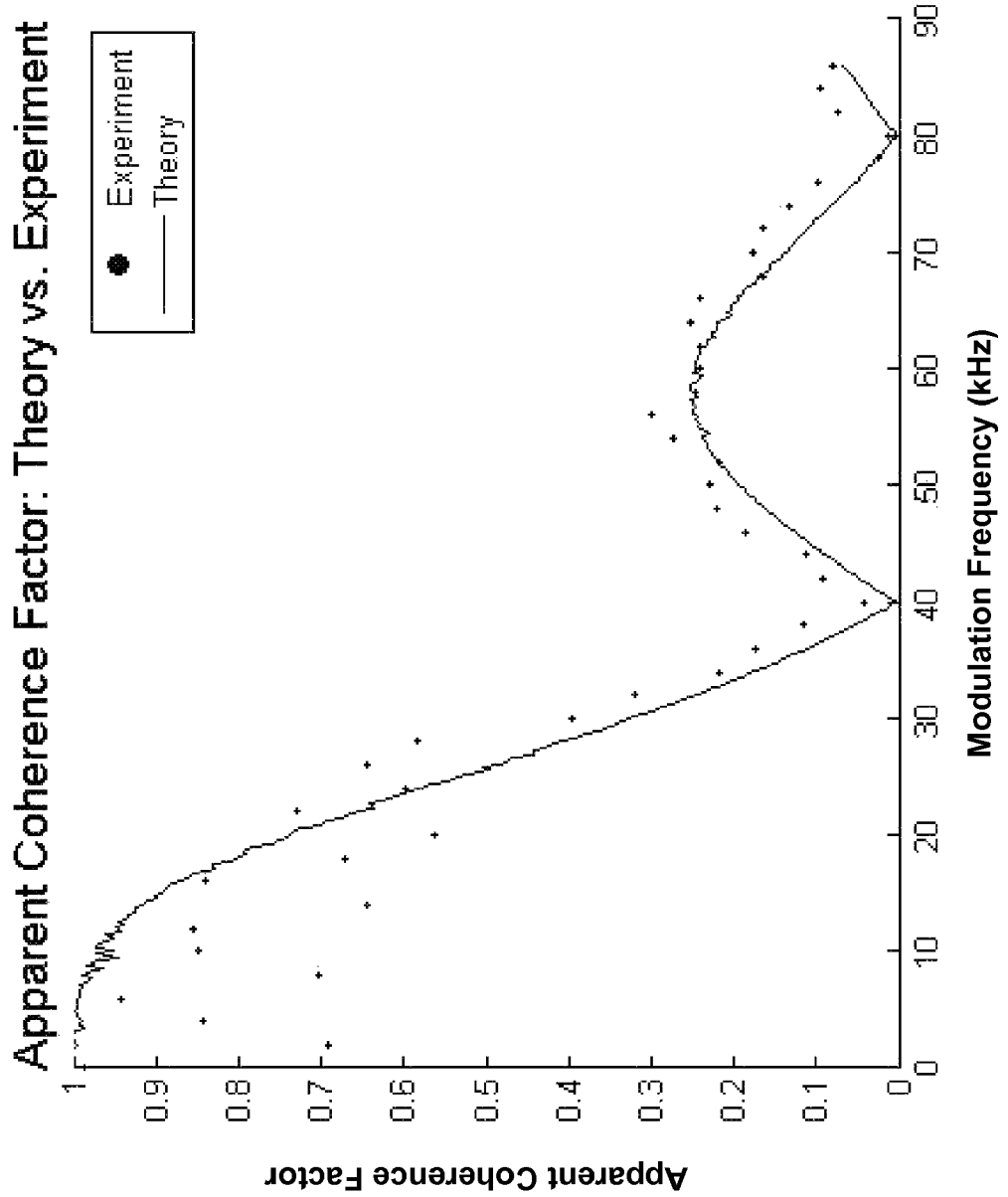
FIG. 1 is a plot comparing a theoretical curve and typical experimental data using the apparent incoherence method for a two leg system.

A novel method is described below that enables even narrow linewidth multiple coherent emitters to appear to produce the uniform illumination characteristic of an incoherent source. Additional significant applications for these techniques are the suppression of laser speckle and environmentally induced scintillation effects. Combining any two coherent electric fields will result in interference effects that spatially redistribute intensity, producing relatively bright and dark areas, commonly called fringes. These fringes are a direct result of the phase difference between the combined fields, giving either constructive or destructive interference. For coherent illumination, the phase relationships between fields are well-defined, producing easily-detected fringes that can be undesirable in applications requiring uniform illumination. The locations of the dark and bright fringes generally shift in an arbitrary manner unless complex systems are utilized to stabilize the path lengths to within small fractions of a wavelength. The approach here eliminates the stringent optical path length stability controls. For incoherent illumination, the phase relationships are not well-defined and can vary rapidly in space and time, resulting in uniform illumination.

In general, the combination of N electric fields will produce a resultant field that is the sum of the individual fields. The instantaneous intensity of these combined fields is defined as, $$I(t) = \sqrt{\frac{\varepsilon_o}{\mu_o}} \cdot |(E_N(t_N))|^2 = \sqrt{\frac{\varepsilon_o}{\mu_o}} \cdot \sum_{i=1}^{N} \sum_{\substack{j=1 \\ j \neq i}}^{N} [|E_i(t_i)|^2 + (E_i(t_i)) \cdot E_j(t_j)] \quad \text{Eq. 1}$$

$$t_i = t - \frac{D_i}{c} = t - \delta t_i \quad \text{Eq. 2}$$

where $D_i$ is the optical path length from the $i^{th}$ source to the observation point, $\delta t_i$ is the time delay from the $i^{th}$ source to the observation point, and $E_i(t)$ represents the independent fields. The second term on the right hand side of Eq. 1 is the cross term between the different contributing fields gives rise to the interference that causes fringes. The $i^{th}$ electric field can be expressed by a cosine, $$E_i(t) = A_i(t_i) \cdot \text{Cos}(\omega_i(t_i) \cdot t_i - \phi_i) \quad \text{Eq. 3}$$

where $A_i(t_i)$ represents the real field amplitude (that can vary with time, such as in a pulsed source), $\omega_i(t_i)$ represents source frequency (that again can vary with time, such as in a chirped source), and $\phi_i$ represents the phase shift accumulated by the $i^{th}$ optical field as it travels from the source to the observation point. When the electric field is expressed in real terms like Eq. 3, then Eq. 1 can be simplified to, $$I(t) = \sqrt{\frac{\varepsilon_o}{\mu_o}} \cdot \sum_{i=1}^{N} \sum_{\substack{j=1 \\ j \neq i}}^{N} \quad \text{Eq. 4}$$

$$\left[ \frac{A_i(t_i)^2}{2}(1 + \text{Cos}[2\omega_i(t_i) \cdot t_i - 2\phi_i]) + A_i(t_i)A_j(t_j) \left\{ \begin{array}{l} \text{Cos}[(\omega_i(t_i) \cdot t_i + \omega_j(t_j) \cdot t_j) - (\phi_i + \phi_j)] + \\ \text{Cos}[(\omega_i(t_i) \cdot t_i - \omega_j(t_j) \cdot t_j) - (\phi_i - \phi_j)] \end{array} \right\} \right]$$

where, $\mu_o$ and $\varepsilon_o$ represent the magnetic and electric permeabilities of free space. Electronic photodetectors can not follow optical frequencies. Terms in Eq. 4 that oscillate at optical frequencies do not contribute to the measured signal and can be neglected. Therefore the signal detected is proportional to the terms below, $$I(t) = \sqrt{\frac{\varepsilon_o}{\mu_o}} \cdot \sum_{i=1}^{N} \sum_{j=i+1}^{N} \quad \text{Eq. 5}$$

$$\left[ \frac{A_i(t_i)^2}{2} + A_i(t_i)A_j(t_j) \cdot \{\text{Cos}[(\omega_i(t_j) \cdot t_i - \omega_j(t_j) \cdot t_j) - (\phi_i - \phi_j)]\} \right]$$

If the beat frequencies ($\omega_i - \omega_j$) are much greater than the detector bandwidth, then the cosine frequency difference term time averages to zero, and the illumination appears incoherent. However, if a single optical beam is divided into two or more optical paths and then recombined the following simplification can be made to Eq. 5. We see from Eq. 6, that the interference term depends only upon the phase differences between the different paths. The second term in the sum is the interference term that gives rise to the phase dependent intensity variations for coherent beams, $$I(t) = \sqrt{\frac{\varepsilon_o}{\mu_o}} \cdot \sum_{i=1}^{N} \sum_{j=i+1}^{N} \left[ \frac{A_i(t_i)^2}{2} + A_i(t_i)A_j(t_j) \cdot \cos[(\phi_j - \phi_i)] \right] \quad \text{Eq. 6}$$

A coherent beam combination scheme would use a multiple output system and nominally equal optical paths lengths in all legs. The desired effect is an output beam with spatial intensity characteristics which remain constant in time. Phase differences $\phi_i - \phi_j$ will vary randomly in time due to changes in the environment. The physical path lengths must be matched and made stable by compensating for these environmental effects, for the measured spatial intensity pattern of the combined beams to remain constant. In general, any method of coherent beam combination requires a very complex and expensive system to dynamically compensate for random phase variations.

With no compensation, random phase variations due to environmental changes can be significant, even in a bench top experiment. Applications that require beam propagation through the atmosphere undergo considerable phase distortion, much of which is caused by scintillation. As phase differences change in time so will spatial intensity patterns. Under these conditions, the intensity projected will be highly non-uniform and will vary from very bright to zero intensity.

Furthermore, the bright and dark spot positions vary in time in an unpredictable way. For a large number of applications these dark spots are unacceptable, and can represent a loss of information. Mathematically we avoid the random coherent combination of the output beam by controlling the phase difference in the cross term in Eq. 6, or making entire cross term go to zero.

A novel incoherent beam combination method for measuring spatially uniform illumination patterns is described. There are many methods for achieving a uniform illumination pattern via incoherent beam combination; one of the simplest being to change the optical path length of the various legs until the coherence length is exceeded, rendering the combined sources incoherent. This method is not described above mathematically, as we have not included coherent sources with a finite spectral width. The drawback to this method is the source is required to have a spectrally wide bandwidth for a practical implementation. A wide bandwidth source is not desirable if a signal transmission and detection application is intended. An increase in spectral bandwidth results in a lower signal to noise ratio. Furthermore, if the source is pulsed, path lengths must be matched to ensure that the pulses temporally overlap when reaching their final target. For nearly transform limited coherent sources with short pulse widths, the required path length mismatch for achieving incoherence is very often greater than or a large fraction of the pulse duration, thus this technique has limited applicability. In addition, narrow linewidth sources, pulsed or continuous wave (CW), may have a very long coherence length. This can make having a path length mismatch greater than this large coherence length inconvenient, again making another solution attractive. Finally, there are also a significant number of important applications where the optical path lengths can not be controlled. The technique described in this patent provides a unique solution to those problems.

The solution introduced here is to independently phase modulate each leg, so that $\phi_i$ and $\phi_j$ are no longer constant in time and can be expressed at the observation point as, $$\phi_i(t) = \phi_{i0} + \beta_i \cdot \sin[\omega_{RF-i} \cdot t_{RF-i} + \xi_{RF-i}] \quad \text{Eq. 7}$$

$$t_{RF-i} = t - \frac{D_{RF-i}}{c} = t - \delta t_{RF-i} \quad \text{Eq. 8}$$

where $\phi_{i0}$ is the time-independent initial phase offset term, $\beta_i$, is the modulation amplitude, $\omega_{RFi}$ is the frequency of the introduced phase modulation on the $i^{th}$ leg, $t_{RF-i}$ describes an earlier time that sums with the propagation time from phase modulator to observation point, $D_{RF-i}/c$, to give t, and $\xi_{RF-0}$ is the initial phase of the phase modulation apparatus. Note from Eq. 8 that $t_{RF-i}$ is just the difference of t with a constant, and that the constant can be absorbed into $\xi_{RF-i}$ strictly to simplify notation in later calculations.

When $\phi_i$ and $\phi_j$ vary with time, interference fringes still exist, and the spatial intensity pattern is also a function of time. When the phase modulation of $\phi_i$ and $\phi_j$ is faster than the integration time of the detector being used or the pulse duration, whichever is shorter, then the fringes will move so quickly they will be averaged by the detector and produce a signal equivalent to incoherent combination, providing that the modulation is properly performed. This is the intuitive picture of incoherent beam combination due to phase modulation. Substituting Eq. 7 into Eq. 6, $$I(t) = \sqrt{\frac{\varepsilon_o}{\mu_o}} \cdot$$

$$\sum_{i=1}^{N} \sum_{j=i+1}^{N} \left[ \frac{A_i(t_i)^2}{2} + A_i(t_i)A_j(t_j) \cdot \cos\left( \begin{array}{c} \phi_{j0} - \phi_{i0} - \beta_i \cdot \sin[\omega_{RF-i} \cdot t_{RF-i} + \xi_{RF-i}] + \\ \beta_j \cdot \sin[\omega_{RF-j} \cdot t_{RF-j} + \xi_{RF-j}] \end{array} \right) \right] \quad \text{Eq. 9}$$

Eq. 9 shows the instantaneous intensity; however, we are more interested in the time averaged intensity, as that is the signal produced by the detector. The calculation below shows the time averaged intensity where $\tau$ represents the integration time of the detector or the pulse duration.

$$I_{Ave} = \left\{ \frac{1}{\tau} \int_T^{T+\tau} \left( \sqrt{\frac{\varepsilon_o}{\mu_o}} \cdot \left[ \sum_{i=1}^{N} \sum_{j=i+1}^{N} \left[ \frac{A_i(t_i)^2}{2} + A_i(t_i)A_j(t_j) \cdot \cos\left( \begin{array}{c} \phi_{j0} - \phi_{i0} + \beta_i \cdot \\ \sin[\omega_{RF-i} \cdot t_{RF-i} + \xi_{RF-i}] \\ -\beta_j \cdot \sin[\omega_{RF-j} \cdot t_{RF-j} + \xi_{RF-j}] \end{array} \right) \right] \right] \right) \cdot dt \right\} \quad \text{Eq. 10}$$

In Eq. 10, T represents the time when the integration begins. The second term in the summation is the interference term which is zero for incoherent beam combination and gives rise to the spatial intensity variations in the illumination pattern.

Eq. 10 can be separated into the term that is common to both coherent and incoherent beam combination, $$I_{Ave\_Inc} = \sqrt{\frac{\varepsilon_o}{\mu_o}} \cdot \frac{1}{\tau} \int_T^{T+\tau} \left( \sum_{i=1}^N \left[ \frac{A_i(t_i)^2}{2} \right] \cdot dt \right) \text{ and} \qquad \text{Eq. 11}$$

the second term in the summation in Eq. 10 term that gives rise to the interference and is unique to the superposition of coherent beams, $$\Delta I_{Ave} = \qquad \text{Eq. 12}$$

$$\left\{ \sqrt{\frac{\varepsilon_o}{\mu_o}} \cdot \frac{1}{\tau} \int_T^{T+\tau} \left[ \sum_{i=1}^N \sum_{j=i+1}^N A_i(t_i) A_j(t_j) \cdot \cos\left( \begin{array}{c} \phi_{j0} - \phi_{i0} + \beta_i \cdot \\ \sin[\omega_{RF-i} \cdot t_{RF-i} + \xi_{RF-i}] \\ -\beta_j \cdot \sin[\omega_{RF-j} \cdot t_{RF-j} + \xi_{RF-j}] \end{array} \right) \right] \cdot dt \right\}$$

this is the coherent interference term that gives rise to intensity fluctuations in the illumination pattern. In the absence of phase modulation, $\Delta I_{Ave}$ represents the change in the measured intensity as the optical phases are varied. When the modulation amplitudes for all of the fields are set equal to zeros of the Bessel function of the first kind of order zero, and the field amplitudes are all equal, then it is possible to find sets of modulation frequencies where the detected intensity fluctuations due to interference between the fields is indistinguishable from an incoherent intensity pattern. Under those conditions, $\Delta I_{Ave}$, the second summation in the integral in Eq. 10 averages to zero, leaving only the incoherent term.

As a convenient metric for evaluating the degree of apparent coherence, we define the Apparent Coherence Factor (ACF), as the ratio of the maximum magnitude of the interference term as the optical and RF phases are varied, $\Delta I_{Ave\_max}$, to the magnitude of the incoherent term $$ACF = \frac{|\Delta I_{Ave\_max}|}{I_{Ave\_Inc}} \qquad \text{Eq. 13}$$

The ACF for perfectly coherent fields has an upper limit of unity while the ACF for perfectly incoherent fields is zero. The ACF defines the worse case performance for a given set of modulation amplitudes, modulation frequencies, and integration time.

Substituting for $I_{Ave\_Inc}$ and $\Delta I_{Ave}$ in Eq. 13 using Eqs. 11 and 12 we obtain, $$ACF = \frac{\left| \frac{1}{\tau} \int_T^{T+\tau} \left[ \sum_{i=1}^N \sum_{j=i+1}^N A_i(t_i) A_j(t_j) \cdot \cos\left( \begin{array}{c} \phi_{j0} - \phi_{i0} + \beta_i \cdot \sin[\omega_{RF-i} \cdot t_{RF-i} + \xi_{RF-i}] - \\ \beta_j \cdot \sin[\omega_{RF-j} \cdot t_{RF-j} + \xi_{RF-j}] \end{array} \right) \right] \cdot dt \right|}{\frac{1}{\tau} \cdot \int_T^{T+\tau} \sum_{i=1}^N \left[ \frac{A_i(t_i)^2}{2} \right] \cdot dt} \qquad \text{Eq. 14}$$

where the apparent coherence is the coherence averaged over a time interval, $\tau$. When there is no RF phase modulation, the ACF is zero for perfectly incoherent light and has an upper limit of unity for perfectly coherent light. Ideally the ACF is independent of the optical phase differences and the RF phase differences, indeed these conditions exist for a two leg system.

However, for most multi-phase modulated systems, it is necessary to use Eq. 14 to calculate the ACF. A worse case value for the ACF can be calculated for a given integration time $\tau$, RF frequencies, $\omega_{RF-i}$, and phase modulation amplitudes, $\beta_i$. Calculating the ACF for all possible values of the optical and RF starting phases will give an upper limit on the Apparent Coherence Factor.

The experimental design parameters that are accessible for minimizing the apparent incoherence factor are: the phase modulation amplitude, $\beta_i$'s, the phase modulation frequencies, $\omega_{RF-i}$'s, and integration time, $\tau$ (though in practical applications $\tau$ is less likely to be an adjustable parameter than frequency and beta). Thus, the intensity fluctuations due to coherent combination can be minimized by adjusting those design parameters to minimize the apparent incoherence factor, ACF, in Eq. 14. Then Eq. 14 can be used to place an upper limit on the residual intensity fluctuations due to interference effects.

2 Legs—One Leg Phase Modulated and One Leg without Phase Modulation

The apparent coherence factor for a two leg system excited by a common coherent source, with one leg phase modulated and one leg unmodulated, can be calculated using Eq. 14 by setting N equal to 2 and $\beta_2$ equal to a zero of the Bessel function of the first kind order 1. It is important to note that the two leg system is the only apparent incoherence method system where optimum performance can be achieved without phase modulating all of the legs. Then, for this two leg system, Eq. 14 simplifies to, $$ACF = \left| \frac{\frac{1}{\tau} \int_T^{T+\tau} [A_1(t_1) A_2(t_2) \cdot \cos(\phi_{20} - \phi_{10} + \beta_1 \cdot \sin[\omega_{RF-1} \cdot t_{RF-1} + \xi_{RF-1}])] \cdot dt}{\frac{1}{\tau} \cdot \int_T^{T+\tau} \left[ \frac{A_1(t_1)^2}{2} + \frac{A_2(t_2)^2}{2} \right] \cdot dt} \right| \qquad \text{Eq. 15}$$

The denominator represents the incoherent field addition, while the numerator represents interference effects. To minimize the coherence effects the experimental parameters must be adjusted so that the ACF is within acceptable limits. Ideally, the ACF should integrate to zero for arbitrary optical phase differences, $\phi_{20} - \phi_{10}$, and for arbitrary RF phases, $\xi_{RF-1}$. Thus the ideal situation occurs when the numerator of the ACF is zero, $$ACF_{Num} = \qquad \text{Eq. 16}$$

$$\left\{ \frac{1}{\tau} \int_T^{T+\tau} \left[ \begin{array}{c} A_1(t_1) A_2(t_2) \\ \cos(\phi_0 + \beta_1 \cdot \sin[\omega_{RF-1} \cdot t_{RF-1} + \xi_{RF-1}]) \end{array} \right] \cdot dt \right\} = 0$$

where $\phi_0 = \phi_{20} - \phi_{10}$ combines the two independent optical phases that can vary from pulse to pulse and $ACF_{Num}$ represents the numerator of the ACF. The numerator of the ACF is proportional to the interference effect amplitudes, therefore when that is zero the interference effects are eliminated over the integration time of the detector.

Solely for the purpose of teaching the principles of the Apparent Incoherent Method, a few simplifying assumptions will be made. Assuming that field amplitudes are square pulses in time, the detector integration time is greater than the pulse duration, $\tau$, and that the pulses from the different path lengths are temporally synchronous, so that $$\frac{|L_1 - L_2|}{c} \ll \tau,$$

where $L_1$ and $L_2$ represent the path lengths of the two legs and c represents the speed-of-light in the medium. These assumptions are made only to clarify the basic principles involved. Under those assumptions, we can rewrite Eq. 16, $$ACF_{Num\_sq} = \left\{ A_1 \cdot A_2 \cdot \frac{1}{\tau} \int_T^{T+\tau} \cos(\phi_0 + \beta_1 \cdot \sin[\omega_{RF-1} \cdot t_{RF-1} + \xi_{RF-1}]) \cdot dt \right\} \quad \text{Eq. 17}$$

where $ACF_{Num\_sq}$ is proportional to the strength of the interference term for the square pulses. When $ACF_{Num\_sq}$ integrates to zero then the photodetector measures a signal that is identical to the signal generated by an incoherent signal even if the different beam paths are derived from a single master oscillator with a very narrow linewidth. Using the cosine sum angle identity Eq. 17 is rewritten, $$ACF_{Num\_sq} = \left\{ \begin{array}{l} A_1 \cdot A_2 \cdot \\ \frac{1}{\tau} \int_T^{T+\tau} \left\{ \begin{array}{l} \cos(\phi_0) \cdot \cos(\beta_1 \cdot \sin[\omega_{RF-1} \cdot t_{RF-1} + \xi_{RF-1}]) \\ -\sin(\phi_0) \cdot \sin(\beta_1 \cdot \sin[\omega_{RF-1} \cdot t_{RF-1} + \xi_{RF-1}]) \end{array} \right\} \cdot dt \end{array} \right\} \quad \text{Eq. 18}$$

Replacing the time dependent terms in Eq. 18 by their respective Fourier Series Eq. 18 can be written in the following form, $$ACF_{Num\_sq} = \quad \text{Eq. 19}$$

$$\begin{bmatrix} A_1 \cdot A_2 \cdot \\ \frac{1}{\tau} \int_T^{T+\tau} \left\{ \begin{array}{l} \cos(\phi_0) \cdot \begin{bmatrix} J_0(\beta_1) + \\ 2 \cdot \sum_{n=1}^{\infty} \begin{bmatrix} J_{2n}(\beta_1) \cdot \\ \cos(2n \cdot (\omega_{RF-1} \cdot \\ t_{RF-1} + \xi_{RF-1})) \end{bmatrix} \end{bmatrix} \\ -\sin(\phi_0) \cdot \begin{bmatrix} 2 \cdot \sum_{n=1}^{\infty} \begin{bmatrix} J_{2n-1}(\beta_1) \cdot \\ \sin((2n-1)(\omega_{RF-1} \cdot \\ t_{RF-1} + \xi_{RF_1})) \end{bmatrix} \end{bmatrix} \end{array} \right\} dt \end{bmatrix}$$

For the superimposed pulses to appear to be incoherent for every pulse regardless of the optical phase difference the integral of each individual term of Eq. 19 must integrate to zero. The other possibility is that individual terms are nonzero but cancel each other. However, that is not a general case because $\phi_0$ and $\xi_{RF-1}$ are random phase terms. If there were nonzero terms that did cancel each other it would partly be a result of these random phase terms, meaning that the next time the experiment is carried out it would be very likely that new random phases would be encountered, eliminating the cancellation. In the worse case, the fringes would blink on and off from pulse to pulse.

Experimentally, one would want to impose conditions that made each individual term integrate to zero regardless of the random phases. Two parameters in Eq. 19, are easily controlled experimentally, $\beta$ and $\omega_{RF-1}$. The only means of zeroing the non time dependent term in Eq. 19 is to set $\beta$ equal to a zero of $J_0$. Ideally the integral of the other terms in Eq. 19 should also be zero. Rigorously, this means that conditions must be adjusted so that the following equalities are true, $$\frac{1}{\tau} \int_T^{T+\tau} \cos(2n \cdot (2\pi \cdot f_{RF-1} \cdot t_{RF-1} + \xi_{RF-1})) dt = 0 \quad \text{Eqs. 20a-c}$$

and $$\frac{1}{\tau} \int_T^{T+\tau} \sin((2n-1) \cdot (2\pi \cdot f_{RF-1} \cdot t_{RF-1} + \xi_{RF-1})) dt = 0$$

where ... $f_{RF-1} = \frac{\omega_{RF-1}}{2\pi}$

Eqs. 20 a and b have the exact analytical solutions given below, $$\frac{1}{\tau} \int_0^\tau \cos(2n \cdot (2\pi \cdot f_{RF-1} \cdot t_{RF-1} + \xi_{RF-1})) dt = \quad \text{Eq. 21a-b}$$

$$\frac{\cos(2 \cdot n \cdot (\xi_{RF-1} + \pi \cdot f_{RF-1}\tau)) \cdot \sin(2 \cdot n \cdot \pi \cdot f_{RF-1} \cdot \tau)}{2 \cdot n \cdot \pi \cdot f_{RF-1} \cdot \tau}$$

$$\frac{1}{\tau} \int_0^\tau \sin((2n-1) \cdot (2\pi \cdot f_{RF-1} \cdot t_{RF-1} + \xi_{RF-1})) dt =$$

$$\frac{\sin(2 \cdot n \cdot (\xi_{RF-1} + \pi \cdot f_{RF-1} \cdot \tau)) \cdot \sin(2 \cdot n \cdot \pi \cdot f_{RF-1} \cdot \tau)}{2 \cdot n \cdot \pi \cdot f_{RF-1} \cdot \tau}$$

Thus, the higher order Bessel functions will independently go to zero, regardless of the random phase terms, when $$f_{RF-1} \tau = m \quad \text{Eq. 22}$$

where m is a positive integer. By using a phase modulator, setting the phase modulation amplitude, $\beta$ equal to a zero of $J_o$, and setting product of the phase modulation frequency times the integration time (often the pulse duration) equal to a positive integer, all of the terms in Eq. 19 are zero, giving perfect apparent incoherence with an ACF equal to zero.

Experimental results were obtained to verify the apparent incoherence method. The intensity interference of a single pulse from a two leg system, where one leg is modulated, was measured. The ACF metric, defined in Eq. 13 was used to compare measured images and theoretical data. A theoretical curve was generated by plotting ACF, Eq 15. The modulation amplitude is set at $\beta$=2.40. This is consistent with the first zero of the zero order Bessel function of the first kind. The phase fluctuations $\Phi_{10}$ and $\Phi_{20}$ were allowed to changes randomly from pulse to pulse, as well as the frequency modulator starting phase $\xi_{RF-1}$. ACF was calculated for a large number of pulses at a specific modulation frequency, e.g., 300, and the largest value of ACF was kept and plotted in the theory curve. This operation was repeated for a range of frequencies, $\omega_{RF-I}$=[0, . . . , 2.15/T], where T is the pulse duration.

The experimental images were taken with a triggered camera, such that one pulse was captured during the integration time of the detector. The captured image is the intensity time averaged over the pulse duration. The random phase fluctuations in the ACF calculation were accommodated by a changing optical path length consistent with any non-stabilized bench top setup. The starting phase of the modulation was also left to be random. FIG. 1 is a plot of the theoretical curve and typical experimental data.

The theoretical curve represents an upper limit (worse case) on the ACF value for an ideal system. The theory and experiment agreed within the error of the experimental measurements.

As stated previously, excellent incoherence can also be achieved if $f_{RF-1} \gg 1/\tau$, in that case the residual amplitude of the interference can be reduced significantly, and for some applications that approach may be sufficient. Through careful inspection, however, we find that modulation frequencies much faster than detector integration time are not necessary. For example, if the pulsed system described above employs a source with 1 ns pulses, a modulation frequency of 1 GHz is sufficient to drive the ACF to zero.

Finally, in practice it is not necessary for the ACF to be zero; in many cases an upper limit of 0.5 is acceptable. Therefore, the exact phase modulation amplitudes and the exact phase modulation frequencies listed can be varied and evaluated using Eq. 14 to calculate the worse case ACF for the system of interest. While the example above was analyzed for a square pulse, it is also possible to adjust the phase modulation frequencies to provide excellent cancellation of the interference for other pulse shapes.

In the more general case for arbitrary pulse shapes and non-ideal values of $\beta$ and $f_{RF-1}\tau$, it is only necessary that $ACF_{design}$ be reduced to an acceptable level for the application of interest, that is $$ACF_{design} \leq ACF_{max} \quad \text{Eq. 23}$$

where $\Delta I_{Ave\_max}$ represents the maximum allowable magnitude of the interference term in the combined beam. Therefore, in practice it is only necessary to adjust the phase modulation amplitude and the product of $f_{RF-1}\tau$ so that, $$ACF_{max} \geq \left| \frac{\frac{1}{\tau}\left|\int_T^{T+\tau} A_1(t_1)A_2(t_2) \cdot \text{Cos}(\phi_0 + \beta_1 \cdot \text{Sin}[\omega_{RF-1} \cdot t_{RF-1} + \xi_{RF-1}]) \cdot dt\right|}{\frac{1}{\tau}\left|\int_T^{T+\tau} \left[\frac{A_1^2(t_1) + A_2^2(t_2)}{2}\right] \cdot dt\right|} \right| \quad \text{Eq. 24}$$

for any arbitrary $\phi_0$ and $\xi_{RF-1}$ to meet the required intensity variation specification for the application of interest.

Multiple Legs Phase Modulated

The apparent incoherence method can be applied to any number of legs, where the numbers of legs that can be combined are limited by the range of modulation frequencies that are possible with the phase modulators used in the implementation. For optimum performance each leg should be phase modulated with the modulation amplitude in each leg equal to a zero of the Bessel function of the first kind of order zero. The design of a multiple leg system, including the two leg system with two phase modulators, is accomplished by adjusting the phase modulation amplitudes, $\beta_i$'s and the modulation frequencies, $\omega_{RF-i}$'s and the integration time, $\tau$ to reduce the $ACF_{max}$ to be less than the maximum acceptable, $ACF_{design}$, for the application of interest. An upper limit on the ACF can be calculated for a given set of $\beta_i$'s, $\omega_{RF-i}$'s and $\tau$ by evaluating Eq. 14, $$ACF = \left| \frac{\frac{1}{\tau}\int_T^{T+\tau}\left[\sum_{i=1}^N \sum_{j=i+1}^N \left[A_i(t_i)A_j(t_j) \cdot \text{Cos}\left(\begin{array}{c}\phi_{j0} - \phi_{i0} + \beta_i \cdot \text{Sin}[\omega_{RF-i} \cdot t_{RF-i} + \xi_{RF-i}] - \\ \beta_j \cdot \text{Sin}[\omega_{RF-j} \cdot t_{RF-j} + \xi_{RF-j}]\end{array}\right)\right]\right]}{\int_T^{T+\tau}\sum_{i=1}^N \left[\frac{A_i(t_i)^2}{2}\right] \cdot dt} \right|, \quad \text{Eq. 14}$$

for a given set of experimental parameters can be determined be evaluating Eq. 14 for all possible values of optical and RF phases and noting the maximum value of the ACF as the phases are varied, $ACF_{max}$. Then as long as $ACF_{max} < ACF_{design}$ that set of parameters will not exceed the design specification. Note that while optimum performance may be achieved with the phase modulation amplitudes set equal to a zero of the Bessel function of the first kind of order zero, in practice the specified performance may be achieved at other phase modulation selections.

DESCRIPTION OF TWO PREFERRED EMBODIMENTS

Figure 2:
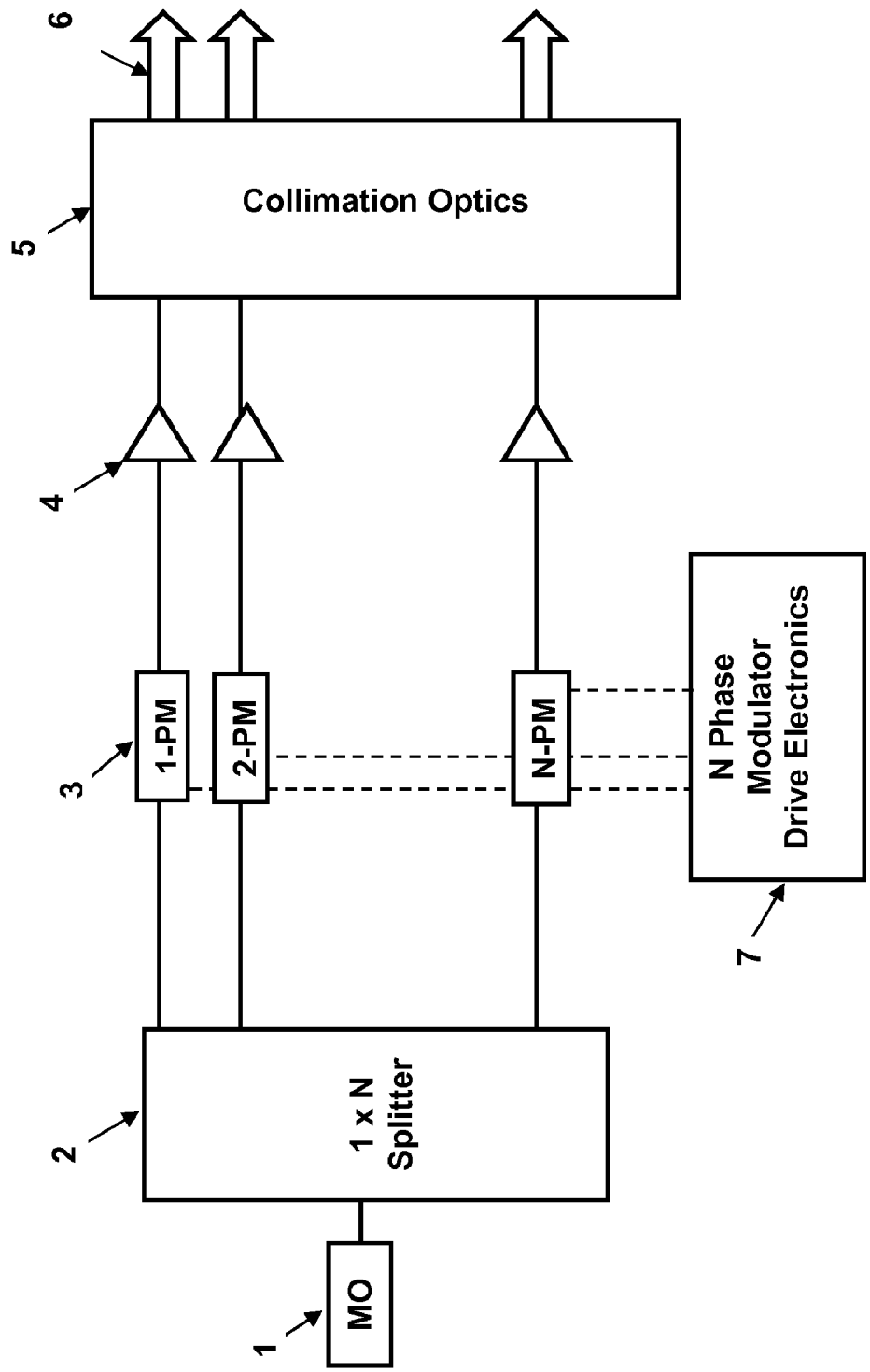
FIG. 2 is a block diagram of a first embodiment of the apparent incoherence method.

A block diagram of one embodiment of the present invention is shown in FIG. 2. The diagram begins with a master oscillator which may be cw or pulsed 1. There may or may not be an optical amplifier incorporated in the master oscillator laser. The output power from the master oscillator is divided by a 1×N power splitter system 2. The power splitter can be constructed from bulk optics, a monolithic optical structure, or a fiber optic system. Each of the N output signals from the 1×N splitter 2 is then directed to N optical phase modulators 3 where each of the N signals is modulated by a unique electronic frequency provided by phase modulator drive electronics 7. N equals two is a special case where the apparent incoherence method (AIM) can be implemented either with both or only one leg requiring a phase modulator 3. This is a unique condition, for N values greater than two the optimum apparent incoherence system requires that there be phase modulators 3 on all of the legs. In principle, optical amplifiers 4 may be incorporated either before or after the optical phase modulators 3, or not at all. Practical concerns such as power handling capability of the components may dictate that the optical amplifiers 4 be placed after the optical phase modulators 3. The outputs of the N legs are then directed towards the array output optics 5. The output beams 6 are then directed to the object to be illuminated so that they overlap on the object.

Figure 3:
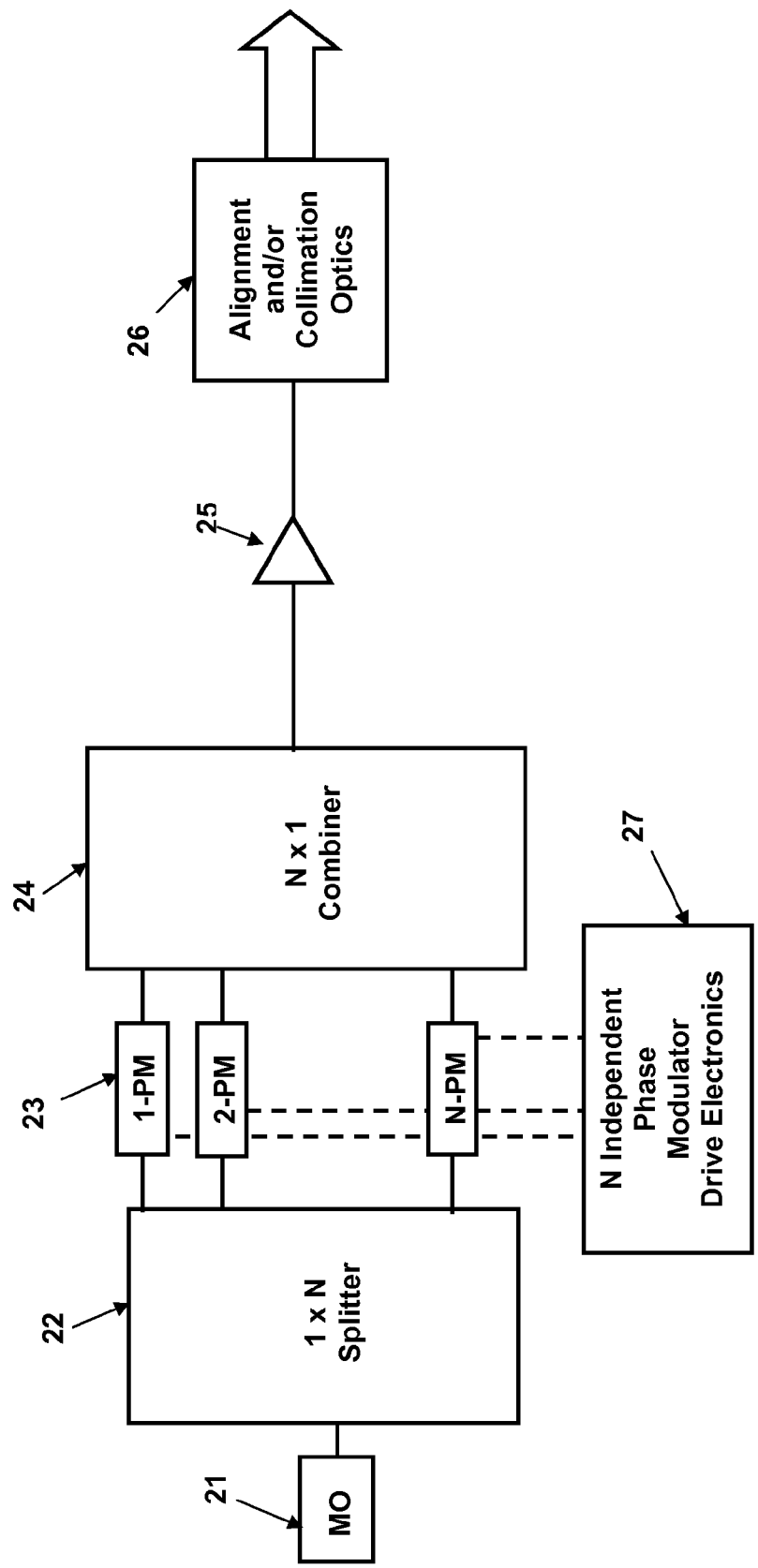
FIG. 3 is a block diagram of a second embodiment of the apparent incoherence method.

A second embodiment of the AIM is shown in FIG. 3. The diagram begins with a master oscillator which may be either pulsed or cw 21. There may or may not be an optical amplifier incorporated in the master oscillator laser. The output power from the master oscillator is divided by a 1×N power splitter system 22. The power splitter can be constructed from bulk optics, a monolithic optical structure, or a fiber optic system. Each of the N output signals from the 1×N splitter 22 is then directed to N optical phase modulators 23 where each of the N signals is phase modulated by a unique electronic frequency provided by phase modulator drive electronics 27. N equals two is a special case where the apparent incoherence method can be implemented either with phase modulators 23 in both legs or with a phase modulator 23 in only one leg. N equals two is a unique condition, for all values of N greater than two the optimum apparent incoherence system requires that there be phase modulators 23 on all of the legs. The outputs of the N phase modulators 23 are directed to the N×1 combiner 24, the power combiner can be constructed from bulk optics, a monolithic optical structure, or a fiber optic system. The output of the power combiner 24 is then directed either to an optical amplifier 25 or to the output optics 26. In principle, optical amplifiers 25 may be incorporated either before or after the optical phase modulators 23 or not at all. Practical concerns such as power handling capability of the components my dictate that the optical amplifiers 26 may be placed after the optical phase modulators. The output of this apparent incoherence embodiment is then directed towards the output optics 26 to illuminate the objects of interest.

The invention claimed is:

1. A system whereby a narrow linewidth coherent laser source when transmitted as a plurality of output signals and subsequently detected at a distance appears to produce the uniform illumination characteristics of an incoherent source thereby suppressing laser speckle and environmentally induced scintillation effects, the system comprised of:
   a. a master oscillator having a narrow linewidth coherent laser output signal;
   b. a 1×N power splitter, whereby the output signal of the master oscillator is split into a plurality of N output signals;
   c. N optical phase modulators, whereby each of said N output signals is modulated by a unique electronic frequency provided by phase modulator drive electronics, the phase modulations being selected to minimize the apparent incoherence factor (ACF) according to predetermined design criteria, said ACF defined as $$ACF = \left| \frac{\frac{1}{\tau} \int_T^{T+\tau} \left[ \sum_{i=1}^{N} \sum_{j=i+1}^{N} \left[ A_i(t_i) A_j(t_j) \cdot \mathrm{Cos}\left( \begin{array}{l} \phi_{j0} - \phi_{i0} + \beta_i \cdot \mathrm{Sin}[\omega_{RF-i} \cdot t_{RF-i} + \xi_{RF-i}] - \\ \beta_j \cdot \mathrm{Sin}[\omega_{RF-j} \cdot t_{RF-j} + \xi_{RF-j}] \end{array} \right) \right] \right] \cdot dt}{\frac{1}{\tau} \cdot \int_T^{T+\tau} \sum_{i=1}^{N} \left[ \frac{A_i(t_i)^2}{2} \right] \cdot dt} \right|$$

where $\tau$, is the integration time, $\omega_{RF-i}$ are the electronic frequencies of the induced phase modulation, $\beta_i$ are the phase modulation amplitudes, $A_i(t_i)$ are the real field amplitudes, $\xi_{RF-i}$ are the phases of the phase modulation apparatus, and $\phi_i$ represents the phase shift accumulated by the ith optical field as it travels from the source to the observation point;
   d. N optical amplifiers to amplify said N phase modulated output signals; and
   e. means for directing said N output signals to an object to be illuminated so that they overlap on the object.

2. The system of claim 1, wherein N equals 2 and only one optical phase modulator is employed.

3. A method whereby a narrow linewidth coherent laser source when transmitted as a plurality of output signals and subsequently detected at a distance appears to produce the uniform illumination characteristics of an incoherent source thereby suppressing laser speckle and environmentally induced scintillation effects, the method comprised of:
   a. splitting a narrow linewidth coherent laser output signal from a master oscillator into N output signals;
   b. phase modulating each of said N output signals by unique electronic frequencies provided by phase modulator drive electronics, the phase modulations being selected to minimize the apparent incoherence factor (ACF) according to predetermined design criteria, said ACF defined as $$ACF = \left| \frac{\frac{1}{\tau} \int_T^{T+\tau} \left[ \sum_{i=1}^{N} \sum_{j=i+1}^{N} \left[ A_i(t_i) A_j(t_j) \cdot \mathrm{Cos}\left( \begin{array}{l} \phi_{j0} - \phi_{i0} + \beta_i \cdot \mathrm{Sin}[\omega_{RF-i} \cdot t_{RF-i} + \xi_{RF-i}] - \\ \beta_j \cdot \mathrm{Sin}[\omega_{RF-j} \cdot t_{RF-j} + \xi_{RF-j}] \end{array} \right) \right] \right] \cdot dt}{\frac{1}{\tau} \cdot \int_T^{T+\tau} \sum_{i=1}^{N} \left[ \frac{A_i(t_i)^2}{2} \right] \cdot dt} \right|$$

where $\tau$, is the integration time, $\omega_{RF-i}$ are the electronic frequencies of the induced phase modulation, $\beta_I$ are the phase modulation amplitudes, $A_i(t_i)$ is the real field amplitude, $\xi_{RF-i}$ is the phase of the phase modulation apparatus, and $\phi_i$ represents the phase shift accumulated by the ith optical field as it travels from the source to the observation point;
   d. optically amplifying said N phase modulated output signals; and
   e. directing said N phase modulated output signals to an object to be illuminated whereby said signals overlap on the object.

4. The method of claim 3, wherein said master oscillator signal is split into only two output signals and only one of said two output signals is phase modulated.

5. A system whereby a narrow linewidth coherent laser source when transmitted as a plurality of output signals and subsequently detected at a distance appears to produce the uniform illumination characteristics of an incoherent source thereby suppressing laser speckle and environmentally induced scintillation effects, the system comprised of:
   a. a master oscillator having a narrow linewidth coherent laser output signal;
   b. a 1×N power splitter, whereby the output signal of the master oscillator is split into a plurality of N output signals;
   c. N optical phase modulators, whereby each of said N output signals is modulated by a unique electronic frequency provided by phase modulator drive electronics, the phase modulations being selected to minimize the apparent incoherence factor (ACF) according to predetermined design criteria, said ACF defined as $$ACF = \left| \frac{\frac{1}{\tau} \int_T^{T+\tau} \left[ \sum_{i=1}^{N} \sum_{j=i+1}^{N} \left[ A_i(t_i) A_j(t_j) \cdot \mathrm{Cos}\left( \begin{array}{l} \phi_{j0} - \phi_{i0} + \beta_i \cdot \mathrm{Sin}[\omega_{RF-i} \cdot t_{RF-i} + \xi_{RF-i}] - \\ \beta_j \cdot \mathrm{Sin}[\omega_{RF-j} \cdot t_{RF-j} + \xi_{RF-j}] \end{array} \right) \right] \right] \cdot dt}{\int_T^{T+\tau} \sum_{i=1}^{N} \left[ \frac{A_i(t_i)^2}{2} \right] \cdot dt} \right|$$

where $\tau$, is the integration time, $\omega_{RF-i}$ are the electronic frequencies of the induced phase modulation, $\beta_i$ are the phase modulation amplitudes, $A_i(t_i)$ are the real field amplitudes, $\xi_{RF-i}$ are the phases of the phase modulation apparatus, and $\phi_i$ represents the phase shift accumulated by the ith optical field as it travels from the source to the observation point;

d. an N×1 combiner to combine said N phase modulated output signals;

d. an optical amplifier to amplify said combined output signal; and e. means for directing said combined output signal to an object to be illuminated.

6. The system of claim 5, wherein N equals 2 and only one optical phase modulator is employed.

7. A method whereby a narrow linewidth coherent laser source when transmitted as a plurality of output signals and subsequently detected at a distance appears to produce the uniform illumination characteristics of an incoherent source thereby suppressing laser speckle and environmentally induced scintillation effects, the method comprised of:

a. splitting a narrow linewidth coherent laser output signal from a master oscillator into N output signals;

b. phase modulating each of said N output signals by unique electronic frequencies provided by phase modulator drive electronics, the phase modulations being selected to minimize the apparent incoherence factor (ACF) according to predetermined design criteria, said ACF defined as $$ACF = \left| \frac{\frac{1}{\tau}\int_T^{T+\tau}\left[\sum_{i=1}^{N}\sum_{j=i+1}^{N}\left[A_i(t_i)A_j(t_j)\cdot \cos\begin{pmatrix}\phi_{j0}-\phi_{i0}+\beta_i\cdot\sin[\omega_{RF-i}\cdot t_{RF-i}+\xi_{RF-i}]-\\ \beta_j\cdot\sin[\omega_{RF-j}\cdot t_{RF-j}+\xi_{RF-j}]\end{pmatrix}\right]\right]\cdot dt}{\frac{1}{\tau}\cdot\int_T^{T+\tau}\sum_{i=1}^{N}\left[\frac{A_i(t_i)^2}{2}\right]\cdot dt} \right|$$

where $\tau$, is the integration time, $\Omega_{RF-i}$ are the electronic frequencies of the induced phase modulation, $\beta_i$ are the phase modulation amplitudes, $A_i(t_i)$ is the real field amplitude, $\xi_{RF-i}$ is the phase of the phase modulation apparatus, and $\phi_i$ represents the phase shift accumulated by the ith optical field as it travels from the source to the observation point;

d. combining said N phase modulated output signals into a single output signal;

e. optically amplifying said combined output signal; and f. directing said combined output signal to an object to be illuminated.

8. The method of claim 7, wherein said master oscillator signal is split into only two output signals and only one of said two output signals is phase modulated.

* * * * *